United States Patent
Eom et al.

(10) Patent No.: US 10,949,781 B2
(45) Date of Patent: Mar. 16, 2021

(54) SYSTEM AND METHOD FOR REPAIRING WIND GENERATOR BASED ON WEATHER INFORMATION

(71) Applicant: DOOSAN HEAVY INDUSTRIES CONSTRUCTION CO., LTD., Gyeongsangnam-do (KR)

(72) Inventors: Seung Man Eom, Gyeonggi-do (KR); Jong Duk Son, Gyeonggi-do (KR); Sang Woo Woo, Chungcheongbuk-do (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 375 days.

(21) Appl. No.: 15/259,946

(22) Filed: Sep. 8, 2016

(65) Prior Publication Data

US 2017/0161671 A1    Jun. 8, 2017

(30) Foreign Application Priority Data

Dec. 7, 2015    (KR) ........................ 10-2015-0173153

(51) Int. Cl.
| | | |
|---|---|---|
| *G06Q 10/06* | (2012.01) | |
| *F03D 17/00* | (2016.01) | |
| *G06Q 10/00* | (2012.01) | |
| *F03D 80/50* | (2016.01) | |
| *G01W 1/02* | (2006.01) | |
| *G01W 1/10* | (2006.01) | |

(52) U.S. Cl.
CPC ..... *G06Q 10/063116* (2013.01); *F03D 17/00* (2016.05); *F03D 80/50* (2016.05); *G01W 1/02* (2013.01); *G01W 1/10* (2013.01); *G06Q 10/20* (2013.01); *F05B 2230/80* (2013.01); *F05B 2260/8211* (2013.01); *Y02E 10/72* (2013.01); *Y02P 70/50* (2015.11); *Y04S 10/50* (2013.01)

(58) Field of Classification Search
None
See application file for complete search history.

(56) References Cited

U.S. PATENT DOCUMENTS

| | | | | |
|---|---|---|---|---|
| 8,253,268 B1 * | 8/2012 | Smith | ................... | F03D 7/0276 290/55 |
| 2009/0170529 A1 * | 7/2009 | Kane | ...................... | H04W 4/90 455/456.3 |

(Continued)

FOREIGN PATENT DOCUMENTS

| | | |
|---|---|---|
| DE | 102007027849 A1 | 12/2008 |
| DE | 102013210090 A1 | 12/2014 |

(Continued)

OTHER PUBLICATIONS

European search report dated Dec. 5, 2017 in corresponding European patent application 16189820.

(Continued)

*Primary Examiner* — Thomas L Mansfield
(74) *Attorney, Agent, or Firm* — Invenstone Patent, LLC

(57) ABSTRACT

The present disclosure relates to a method and a system for repairing a wind generator based on weather information. According to an exemplary embodiment of the present disclosure, it is possible to effectively calculate a repairing time of the wind generator based on weather information.

6 Claims, 2 Drawing Sheets

(56) References Cited

U.S. PATENT DOCUMENTS

| | | | | |
|---|---|---|---|---|
| 2010/0183440 A1* | 7/2010 | Von Mutius | .......... | F03D 7/0264 |
| | | | | 416/1 |
| 2012/0161446 A1* | 6/2012 | McNeill | ................ | F03D 17/00 |
| | | | | 290/55 |
| 2013/0099496 A1* | 4/2013 | Solheim | ................ | F03B 13/142 |
| | | | | 290/44 |
| 2013/0332220 A1* | 12/2013 | Nielsen | ................ | G06Q 10/20 |
| | | | | 705/7.21 |
| 2014/0129272 A1* | 5/2014 | Hanley | ............ | G06Q 10/06311 |
| | | | | 705/7.13 |
| 2014/0244328 A1* | 8/2014 | Zhou | ...................... | G06Q 10/20 |
| | | | | 705/7.13 |

FOREIGN PATENT DOCUMENTS

| | | |
|---|---|---|
| KR | 10-2013-0026107 A | 3/2013 |
| KR | 10-2013-0031344 A | 3/2013 |
| KR | 10-2013-0093567 A | 8/2013 |

OTHER PUBLICATIONS

Office Action issued in corresponding Korean Application No. 10-2015-0173153 dated Aug. 12, 2016, 5 pages.

* cited by examiner

SYSTEM AND METHOD FOR REPAIRING WIND GENERATOR BASED ON WEATHER INFORMATION

CROSS-REFERENCE TO RELATED APPLICATION(S)

This application claims priority to Korean Patent Application No. 10-2015-0173153, filed on Dec. 7, 2015, the disclosure of which is incorporated herein by reference in its entirety.

BACKGROUND

Exemplary embodiments of the present disclosure relate to a system and a method for repairing a wind generator, and more particularly, to a system and a method for repairing a wind generator capable of effectively calculating repairing time of the wind generator based on weather information.

A wind generator like a wind turbine is an environmentally-friendly power plant that converts rotational energy generated by wind into electric energy and is a part of new renewable energy businesses that have been spotlighted recently as the need to protect the earth's environment is getting more important.

The wind generator is installed forming a farm and the management of the wind generator is performed by monitoring and an operation control in a central management office. Further, a worker goes into a field to perform maintenance of the wind generator.

Here, a structure of the wind generator may be largely divided into a nacelle, a tower, and a foundation. The nacelle is configured of various parts such as a plurality of blades, a hub, a rotor, a generator, a bearing, various kinds of sensors, and a yaw brake apparatus.

Each part of the wind generator may be aged due to long-term use or may be stressed with a sudden change in outside environment such as a sudden change in wind direction, a storm, and a heavy rain, and as a result may be damaged.

Generally, wind generator farms may be created in mountains, seas, or the like where wind is strong. Many wind generator farms are far away from downtown areas and are not easily approached. As a result, a worker may not perform repair work such as replacing or fixing parts of the wind generator at any time due to a problem of his work load and maintenance costs, but performs the repairing work at an appointed specific time.

Therefore, a method for saving maintenance costs and improving work efficiency by determining appropriate repairing time of a wind generator is desirable.

BRIEF SUMMARY

An object of the present disclosure relates to a method and a system for efficiently calculating repairing time based on weather information.

Other objects and advantages of the present disclosure can be understood by the following description, and become apparent with reference to the embodiments of the present disclosure. Also, it is obvious to those skilled in the art to which the present disclosure pertains that the objects and advantages of the present invention can be realized by the apparatus and methods as claimed and combinations thereof.

In accordance with one aspect of the present disclosure, a method for repairing a wind generator based on weather information includes: a weather information analyzing step of analyzing weather information corresponding to at least any one of a wind velocity, a precipitation, a wave height, and temperature by receiving the weather information of a wind generator area; a repairing duration calculating step of calculating a repairing duration based on a previously input database if a repairing type, repairing personnel, and the weather information are input; and a repairing time determining step of deriving wind generator repairing time by comparing and determining a weather condition holding days depending on the analyzed weather information with the calculated repairing duration.

The method may further include: a step of determining whether repairing is required or not by comparing and determining a weather condition depending on the analyzed weather information with a pre-established workable weather condition.

The method may further include: an emergency situation notifying step of receiving real-time weather information during the repairing work and comparing the received real-time weather information with a preset workable weather condition to transmit a shelter signal to a user.

The method may further include: a shelter area notifying step of detecting a real-time position of the user and notifying the user of at least any one of a direction and a distance to a safety area, when the shelter signal is transmitted.

The method may further include: an extra work time determining step of calculating a remaining work execution time by comparing a repairing duration depending on a remaining work load with a weather state holding time depending on real-time weather information if the user inputs an interrupted work progress.

The method may further include: a part state diagnosing step of diagnosing a part state in real time by receiving a threshold performance numerical value or an operating signal of a previously established wind generator part.

The method may further include: a repairing type determining step of determining a required repairing type or priority by comparing at least any one of the diagnosed state of each part, warehousing and a stock condition of each part that are previously input, a business trip and a vocation state of the user.

The method may further include: a weather information variable correcting step of correcting received variables of the weather information by averaging weather conditions for each season and each time or weather information received by a plurality of observation posts.

In the weather information variable correcting step, the weather information of the wind generator area is primarily corrected by averaging the weather conditions of a specific time this year measured at the observation posts of several areas and an error is secondarily corrected by comparing and analyzing the weather information of the wind generator area with the weather information for each season and each time in the last few years corresponding to the specific time.

In the step of determining whether the repairing is required or not and the repairing time determining step, the weather information analyzed in the weather information analyzing step is received or the weather information of which the variables are corrected in the weather information variable correcting step is received.

In accordance with another aspect of the present disclosure, a system for repairing a wind generator based on weather information includes: a weather information analysis module analyzing weather information corresponding to at least any one of a wind velocity, a precipitation, a wave height, and temperature by receiving the weather information of a wind generator area; a repairing duration calculation module calculating a repairing duration based on a previously input database if a repairing type, repairing personnel, and the weather information are input; and a repairing time determination module deriving wind generator repairing time by comparing and determining a weather condition holding days depending on the analyzed weather information with the calculated repairing duration.

The system may further include: a module determining whether repairing is required or not determining whether repairing is required or not by comparing and determining a weather condition depending on the analyzed weather information with a pre-established workable weather condition.

The system may further include: an emergency situation notification module receiving real-time weather information during the repairing work and comparing the received real-time weather information with a preset workable weather condition to transmit a shelter signal to a user.

The system may further include: a shelter area notification module detecting a real-time position of the user and notifying the user of at least any one of a direction and a distance to a safety area, when the shelter signal is transmitted.

The system may further include: an extra work time determination module calculating a remaining work execution time by comparing a repairing duration depending on a remaining work load with a weather state holding time depending on real-time weather information if the user inputs an interrupted work progress.

The system may further include: a part state diagnosis module diagnosing a part state in real time by receiving a threshold performance numerical value or an operating signal of a previously established wind generator part.

The system may further include: a repairing type determination module determining a required repairing type or priority by comparing at least any one of the diagnosed state of each part, warehousing and a stock condition of each part that are previously input, a business trip and a vocation state of the user.

The system may further include: a weather information variable correction module correcting received variables of the weather information by averaging weather conditions for each season and each time or weather information received by a plurality of observation posts.

The weather information variable correction module may primarily correct the weather information of the wind generator area by averaging the weather conditions of a specific time this year measured at the observation posts of several areas and secondarily correct an error by comparing and analyzing the weather information of the wind generator area with the weather information for each season and each time in the last few years corresponding to the specific time.

The module determining whether the repairing is required or not and the repairing time determination module may receive the weather information analyzed in the weather information analyzing step or receive the weather information of which the variables are corrected from the weather information variable correction module.

According to the exemplary embodiments of the present disclosure, it is possible to effectively calculate the repairing time for each part of which the repairing is required by receiving the weather information on the wind generator area and comparing the repairing time required for each work based on the previously established database of the repairing type, the repairing personnel, or the like.

Further, the user may rapidly cope with the weather condition that is suddenly changed like a shower, a snowstorm, a wave, or the like by continuously receiving the real-time weather information even during the repairing work and informing the user of the sudden weather change. Further, the life and work safety of the user may be promoted by detecting the current position of the user and informing the user of the direction and distance up to the safety area.

Further, the user may effectively finish the interrupted extra work by receiving the weather information to detect the weather condition holding time and then informing the user of the appropriate extra work starting time.

In addition, the repairing priority may be determined by continuously monitoring the parts of the wind generator and comparing the warehousing and the stock condition of parts to be repaired, the user's state, or the like.

Consequently, this may repair the appropriate parts of the wind generator at the appropriate time to improve the management efficiency of the wind generator and save the maintenance costs and the work load of the wind generator.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SPECIFIC EMBODIMENTS

The determination of the repairing time of the wind generator farm is a matter of interest. In particular, a weather condition of the wind generator area has a big effect on the determination of the repairing time. For example, to repair parts of an offshore wind generator, a worker gets on a vessel with which parts are loaded and reaches a field where a wind generator is present to start the repairing work. Therefore, a wind velocity, a wave height, or the like act as important repairing limiting elements.

Hereinafter, a method and a system for repairing a wind generator based on weather information according to an exemplary embodiment of the present disclosure will be described with reference to the accompanying drawings.

Figure 1:
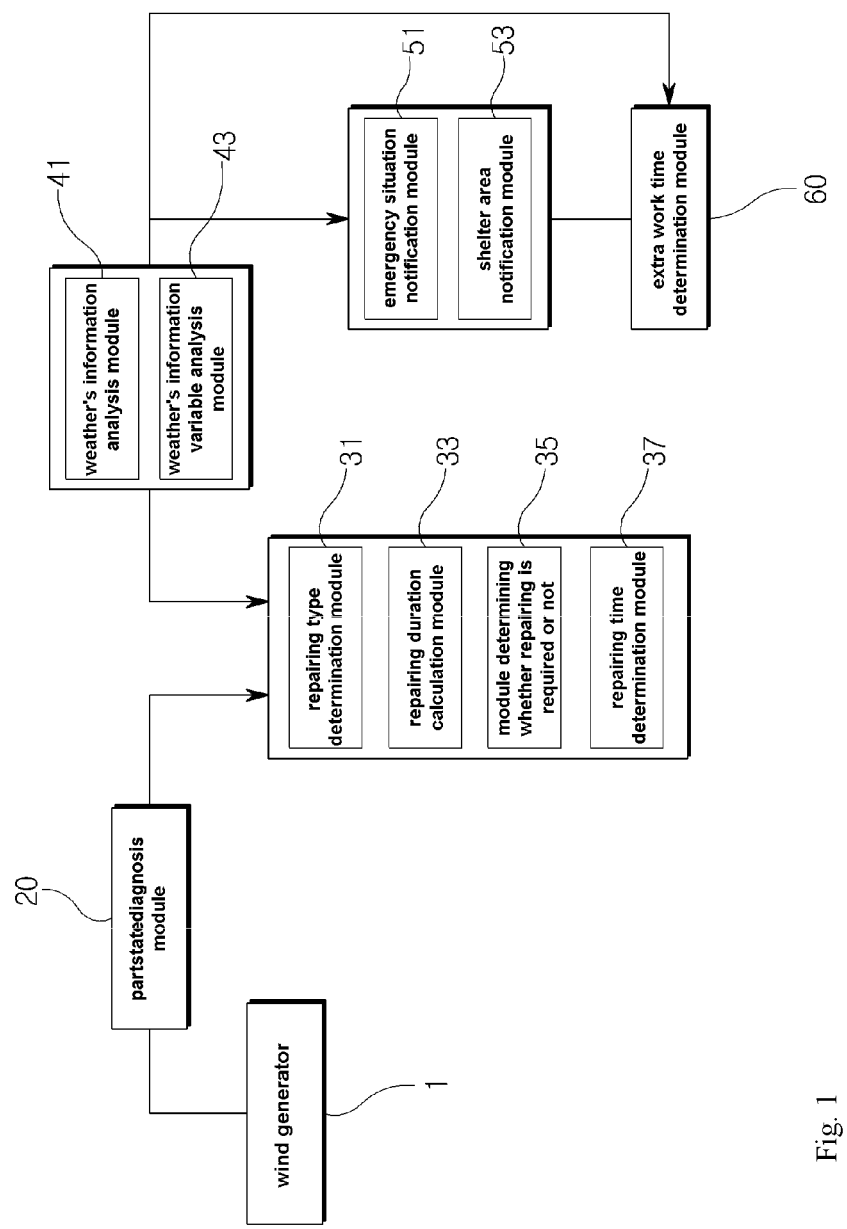
FIG. 1 is a diagram illustrating a system for repairing a wind generator according to an exemplary embodiment of the present disclosure.

FIG. 1 is a diagram illustrating a system for repairing a wind generator according to an exemplary embodiment of the present disclosure. Referring to FIG. 1, a system for repairing a wind generator according to an exemplary embodiment of the present disclosure may be configured to include a part state diagnosis module 20, a weather information analysis module 41, a weather information variable correction module 43, a repairing type determination module 31, a repairing duration calculation module 33, a module 35 determining whether repairing is required or not, and a repairing time determination module 37.

However, the configuration of the system is not limited thereto, and therefore the system may be configured to include only the weather information analysis module 41, the repairing duration calculation module 33, and the repairing time determination module 37.

In this case, the weather information analysis module 41 may serve to analyze weather information corresponding to at least any one of a wind velocity, precipitation, a wave height, and temperature by receiving the weather information of the wind generator area and the repairing duration calculation module 33 may calculate the repairing duration based on a previously input database if the weather information analyzed by the weather information analysis module 41 is input.

Further, the repairing time determination module 37 may compare and determine weather condition holding days depending on the weather information analyzed by the weather information analysis module 41 with the calculated repairing duration to determine the repairing time, thereby deriving the repairing time of the wind generator.

This will be described in detail below.

First, the part state diagnosis module 20 may receive preset threshold performance numerical values or operating signals for parts of the wind generator to diagnose the state of the parts in real time.

Here, the threshold performance numerical values of the parts represents part performance within a range that do not exceed a preset threshold value of an allowable power generation loss when specific parts are mounted in the wind generator to perform functions. The threshold performance numerical values of parts may be differently set for each part configuring the wind generator.

For example, when minimum performance (new product) of a yaw brake part braking a yawing motion of a nacelle is set to be 100, a user may set the threshold performance numerical value for efficiently braking the yawing motion of the nacelle to be 70.

Further, when the yaw brake part is aged or damaged, a braking value of the yaw brake is increased but the yawing motion of the nacelle is not suppressed in response to the increase in the braking value.

In this case, the part state diagnosis module 20 diagnoses a current performance numerical value of the yaw brake part and when the performance numerical value is diagnosed to be less than 70 preset by a user, transmits the information to the user.

Of course, even when parts are not operated, the part state diagnosis module 20 receives signals from operating sensors mounted in the parts and transmits the information to the user.

The part performance diagnosis module diagnoses the change in the threshold performance numerical value at a predetermined period. Of course, the part performance diagnosis module may also continuously diagnose the change in the threshold performance numerical value in real time in response to the operating environment. Further, the part state diagnosis module 20 may simultaneously diagnose the state of the parts.

The part state diagnosis module 20 may be omitted according to the embodiment.

Next, the repairing type determination module 31 may determine a required repairing type or priority by comparing at least any one of the state of each part diagnosed by the part state diagnosis module 20, the warehousing and stock condition of each part previously input, and a business trip and a vacation state of a user.

In detail, this will be described with reference to the following Table 1, for instance.

TABLE 1

| Division | Maximum performance numerical value (example) | Threshold performance numerical value (example) | Measured performance numerical value (example) | Part state (example) | User state (example) |
|---|---|---|---|---|---|
| Yaw brake | 100 | 70 | 64 | Stock (1) | Required personnel (4) Available personnel (20) Vacation and business trip (6) |
| Power generator bearing | 100 | 50 | 45 | Stock (O) Warehouse schedule (1) | Required personnel (3) Available personnel (5) Vacation and business trip (3) |
| Blade | 100 | 60 | 70 | Stock (3) | Required personnel (10) Available personnel (30) Vacation and business trip (7) |

In this case, a yaw brake pad is used for a long period of time or under the environment in which a wind direction is suddenly changed is continuously worn and the threshold performance numerical vale of the yaw brake part is gradually reduced in response to a reduction in oil pressure supply ability.

First, the performance numerical values for the yaw brake part and the power generator bearing part measured by the part state diagnosis module 20 each are 64 and 45, and therefore have values less than threshold performance numerical values 70 and 50 preset by each user. On the other hand, the performance numerical value measured for the blade part is 70 and therefore has a value that is equal to or more than the preset threshold performance numerical value 60.

Therefore, the repairing type may be determined as the yaw brake part and the power generator bearing. The performance numerical value measured for the blade part is diagnosed to be equal to or more than the threshold performance numerical value, and therefore the blade part is not yet the repairing time. Even if the performance numerical value of the part is equal to or more than the threshold performance numerical value, the replacement of the part may cause the unnecessary increase in maintenance costs, which is not preferable.

Further, if the repairing type is determined, the priority of the repairing determined based on the state of parts and the user state is determined. That is, the priority is determined by synthetically considering whether parts in stock are present currently, when the parts are warehoused if the parts in stock are not present, personnel required for work, available personnel for work having repairing skills for the corresponding parts, whether a user is currently on vacation and business trip. Of course, the determination may be based on the database that is input and maintained in real time.

Referring back to the above Table 1, the yaw brake part is currently in stock and personnel required for repairing is four but available personnel having repairing skill is 20. Therefore, 6 among the available personnel are on vacation or business trip, and therefore the yaw brake part is currently in a repairable state.

However, the power generator bearing part is not in stock and is planning to be warehoused. Further, personnel required for repairing is three and available personnel having repairing skill is 5. Here, 3 among the available personnel are on vacation or business trip, and therefore the repairing may not be currently made.

As a result, in connection with the priority, the repairing of the yaw brake part of which the stock and the user state is currently available is determined to be a prior order and the repairing of the power generator bearing part is determined to be a posterior order.

Of course, it is apparent that the repairing type or the priority determined by the repairing type determination module 31 may be considered, including other elements other than the determined elements.

The repairing type determination module 31 may be omitted according to the embodiment.

Next, the repairing duration calculation module 33 may calculate the repairing duration based on the previously input database if the repairing type, the repairing personnel, and the weather information are input.

For example, if the repairing type is input as the replacement of the yaw brake part, the repairing personnel is input as four, and a specific weather information value corresponding to at least any one of the specific wind velocity, the precipitation, the wave height, and the temperature is input, the time when the user is required to perform the replacement work of the yaw brake part is calculated in response to the weather condition.

TABLE 2

| Repairing type (example) | Repairing personnel (example) | Weather information (example) | Repairing duration (example) |
| --- | --- | --- | --- |
| Yaw brake | 4 | Wind velocity of 5 m/s | 21 H |
|  |  | Wind velocity of 7 m/s | 24 H |
|  |  | Threshold wind velocity of 14 m/s | . |
|  | 6 | Wind velocity of 5 m/s | 16 H |
|  |  | Wind velocity of 7 m/s | 19 H |
|  |  | Threshold wind velocity of 14 m/s | . |

Referring to the above Table 2, if the user inputs a wind velocity of 5 m/s, a total of repairing duration is calculated like 21 H. The above Table 2 is shown considering only one weather information (wind velocity), but the weather information such as the wind velocity, the precipitation, the wave height, the temperature may be compositely input. Therefore, the pre-established database may include the repairing durations against various weather conditions.

The database may be one that may be input and stored in a database form by the user by averaging and error-correcting the repairing durations based on the work conditions previously performed in the wind generator area.

Next, the weather information analysis module 41 may receive the weather information of the wind generator area to analyze the weather information corresponding to at least any one of the wind velocity, the precipitation, the wave height, and the temperature. This extracts the weather information associated with the repairing of the wind generator among a variety of weather information transmitted from a meteorological office. For example, if weakly weather information from Monday to Friday is received, the wind velocity, the wave height, or the like of the corresponding area in which the wind generator is disposed are extracted from the weakly weather information to analyze days when wind having a threshold wind velocity at which the repairing is not hindered to perform blows, days when a wave less than the threshold wave height hits, or the like.

Meanwhile, the weather information variable correction module 43 may average an average weather condition for each season and each time or the weather information received at a plurality of observation posts to correct the received variables of the weather information. For example, a weather condition predicted in this summer or in July is predicted by averaging the weather conditions of summer season temperature, precipitation, or the like in the last five years or temperature, precipitation, or the like in July in the last five years and the error is corrected by comparing and determining the predicted weather condition with the received weather information.

Further, the error from the weather information received from each observation post may be corrected by averaging the weather information received from the observation posts in several areas measuring the wind generator area.

The variable correction may be performed stepwise. First, the variable correction may be performed in such a manner that the weather information of the wind generator area is primarily corrected by averaging the weather conditions of this specific time measured at the observation posts of several areas, and then the error is secondarily corrected by comparing and analyzing the weather information of the wind generator area with the weather information for each season and each time in the last few years corresponding to the specific time. In this case, the variable correction of the weather information may be more accurately performed.

The weather information variable correction module 43 may be omitted according to the embodiment.

Next, the module 35 determining whether the repairing is required or not compares and determines the weather condition depending on the analyzed weather information with the pre-established workable weather condition to determine whether the wind generator may be repaired or not. For example, in the case of repairing the offshore wind generator, the user needs to get on a vessel with which parts are loaded to approach the offshore wind generator. In this case, the approach to the offshore wind generator is greatly affected by the wind velocity and the wave height.

which the variables are corrected from the weather information variable correction module 43.

The module 35 determining whether the repairing is required or not may be omitted according to the embodiment.

Next, the repairing time determination module 37 may compare and analyze the weather condition holding days of the specific time depending on the weather information analyzed by the weather information analysis module 41 or the weather information of which the variables are corrected by the weather information variable correction module 43 with the repairing duration calculated by the repairing duration calculation module 33 to determine the repairing time, thereby deriving the repairing time of the wind generator.

TABLE 3

| Repairing type (example) | Repairing personnel (example) | Transportation method and weather limit (example) | Moving time up to wind generator (example) | Repairing duration (example) | Part shipping weight (example) |
|---|---|---|---|---|---|
| Yaw brake | 4 | Vessel Threshold wind velocity: 14 m/s Threshold wave height: 3 m/s | 1 H | 20 H | 6.3 ton |
| Power generator bearing | 3 | Vessel) Threshold wind velocity: 14 m/s Threshold wave height: 3 m/s | 1 H | 5 H | 6.3 ton |
| Blade | 10 | Hoist crane Threshold wind velocity: 8 m/s Threshold wave height: 1 m/s | 3 H | 8 H | 100 ton |

Referring to the above Table 3, in the case of repairing the yaw brake or the power generator bearing of the offshore wind generator, for the user getting on a vessel with which parts are loaded to approach the offshore wind generator, the threshold wind velocity needs to be less than 14 m/s and the threshold wave height needs to be less than 3 m/s. If the received weather information is equal to or more than at least any one value of the threshold wind velocity and the threshold wave height, the module 35 determining whether the repairing is required or not determines that the repairing may not be performed.

Further, in the case of repairing the blade, for the user getting on the hoist crane with which parts are loaded to approach the offshore wind generator, the threshold wind velocity needs to be less than 8 m/s and the threshold wave height needs to be 1 m/s, and therefore if the weather information having a value higher than that is received, the module 35 determining whether the repairing is required or not determines that the repairing may not be performed.

On the contrary, if the weather information less than the threshold wind velocity and the threshold wave height, respectively, is received, the module 35 determining whether the repairing is required or not determines that the repairing may be performed.

Here, the module 35 determining whether the repairing is required or not may immediately receive the weather information from the weather information analysis module 41 and when weather information variable correction module 43 is provided, may also receive the weather information of

TABLE 4

| Division | July 1~2 (example) | July 3~4 (example) | July 5~7 (example) |
|---|---|---|---|
| Weather condition | Wind velocity: 12 m/s Wave height: 3 m/s | Wind velocity: 7 m/s Wave height: 0.5 m/s | Wind velocity: 14 m/s Wave height: 4 m/s |

For example, referring to the above Table 4, the repairing time determination module 37 acquires weather information of specific time of July in the summer through the weather information analysis module 41 or the weather information variable correction module 43. Thereafter, the weather information on the wind velocity and the wave height of each day in connection with the offshore wind generator work is extracted.

As shown in the above 4, the weather information between July 1~2 is a wind velocity of 12 m/s and a wave height of 3 m/s and the weather condition for the repairing of the offshore wind generator is bad (based on the above Table 3). Further, the weather information between July 5~7 is a wind velocity of 14 m/s and a wave height of 4 m/s and the weather condition for the repairing of the offshore wind generator is bad (based on the above Table 3). However, the weather information between July 3~4 is a wind velocity of 7 m/s and a wave height of 0.5 m/s and the weather condition for the repairing of the offshore wind generator is good.

Next, the repairing time determination module 37 determines that the weather condition between July 3~4 is good and acquires that the weather condition holding days is about 2 days (about 48 hours). Further, it is determined whether each repairing work may be performed based on the information received from the repairing duration calculation module 33. In the case of the repairing of the yaw brake based on the above Table 3, the repairing duration is 20 H, and therefore the repairing may be performed. Therefore, the repairing time determination module 37 determines that the repairable time is July 3~4.

Next, the user determines that date determined by the repairing time determination module 37 is the repairing time to perform the work procedure.

Meanwhile, the system for repairing a wind generator according to the exemplary embodiment of the present invention may be configured to further include an emergency situation notification module 51, a shelter area notification module 53, and an extra work time determination module 60. The emergency situation notification module 51, the shelter area notification module 53, and the extra work time determination module 60 may be a module that is operated while the user does work in the wind generator area.

First, the emergency situation notification module 51 may receive real-time weather information during the repairing work in the wind generator area and compare the received weather information with the pre-established workable weather condition to transmit a shelter signal to a user. For example, when the received real-time weather condition is equal to or more than a wind velocity of 14 m/s and a wave height of 3 m/s, as shown in the above Table 4, the repairing work of the offshore wind generator has a problem in that the user hardly approaches the offshore wind generator by vessel and needs to continuously do work in the state in which the vessel is anchored, such that the repairing work may not be smoothly performed.

In this case, the emergency situation notification module 51 transmits the shelter signal to a user's terminal to notify that the current weather condition is suddenly getting worse. The user temporarily interrupts the repairing work to prevent safety accident from occurring thanks to the notification.

The emergency situation notification module 51 may be omitted according to the embodiment.

Next, the shelter area notification module 53 may serve to detect a real-time position of a user and notify the user of at least any one of a direction and a distance to a safety area, when a shelter signal is transmitted from the emergency situation notification module 51.

The real-time position of the user may be detected using a GPS apparatus. In the case of repairing, for example, the offshore wind generator, the shelter direction and distance about a shelter area that is an area where a wind velocity and a wave height are stabilized are notified to the user. The user may rapidly move to the most safety area based on the information received from the shelter area notification module 53, in the state which the weather condition is suddenly changed.

The shelter area notification module 53 may be omitted according to the embodiment.

Next, the extra work time determination module 60 receives the shelter signal from the emergency situation notification module 51 or receives the shelter area from the shelter area notification module 53, and then if the user inputs a work progress interrupted due to the change in the weather condition, the extra work time determination module 60 may compare the repairing duration depending on the remaining work load with the weather condition holding time depending the real-time weather information to determine the remaining work execution time.

That is, by receiving the weather information, the current weather condition corresponds to the threshold wind velocity, the threshold wave height, or the like but the time when the weather condition in which the repairing work may be performed at a specific time is maintained is detected. Further, if the user inputs the expected paring duration depending on the remaining work load due to the interruption of the repairing work, the extra work time determination module 60 compares the repairing workable weather condition holding time with the expected repairing duration and thus the extra work time determination module 60 provides the information to the user if the weather condition holding time when the repairing work may be performed is shorter and the user determines a final work interruption and a work withdrawal. On the contrary, when the weather condition holding time when the repairing work may be performed is sufficient, the extra work time determination module 60 provides the information to the user and the user waits a specific time and then again returns to the wind generator area if the weather condition of the wind velocity, the wave height, or the like at the specific time is good to thereby finish the extra work.

The extra work time determination module 60 may be omitted according to the embodiment.

The system for repairing a wind generator according to the exemplary embodiment of the present disclosure has a configuration as described above. Hereinafter, a method for repairing a wind generator based on the configuration will be described.

Figure 2:
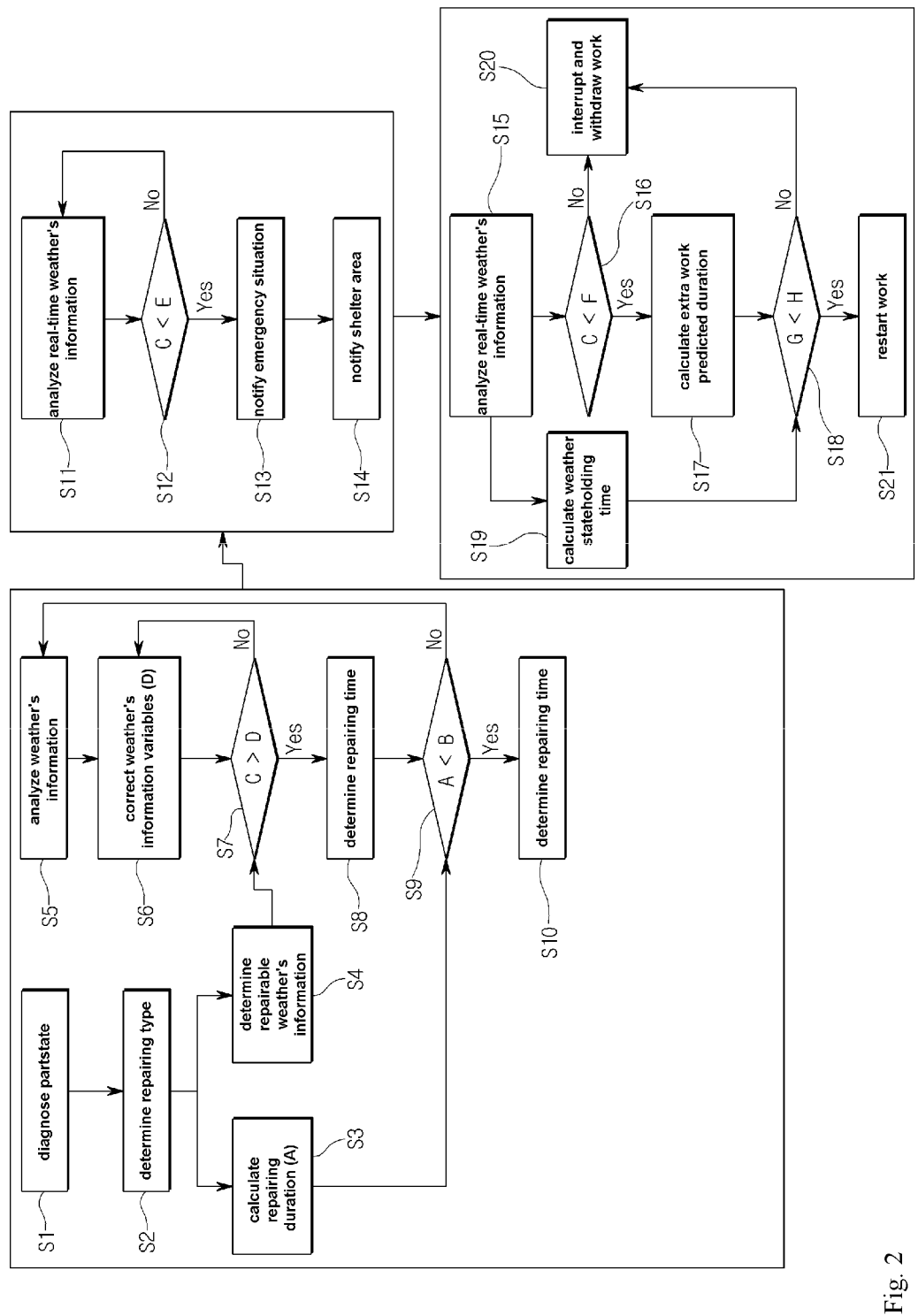
FIG. 2 is a diagram illustrating a method for repairing a wind generator according to an exemplary embodiment of the present disclosure.

FIG. 2 is a diagram illustrating a method for repairing a wind generator according to an exemplary embodiment of the present invention. Referring to FIG. 2, a method for repairing a wind generator according to an exemplary embodiment of the present disclosure may be configured to include a part state diagnosing step (S1), a weather information analyzing step (S5), a weather information variable correcting step (S6), a repairing type determining step (S2), a repairing duration calculating step (S3), a step (S7) of determining whether repairing is required or not, and repairing time determining steps (S8 and S9).

However, the method is not limited thereto, and therefore the method may be configured to include only the weather information analyzing step (S5), the repairing duration calculating step (S3), and the repairing time determining steps (S8 and S9).

In this case, the weather information analyzing step (S5) is a step of analyzing the weather information corresponding to at least any one of the wind velocity, the precipitation, the wave height, and the temperature by receiving the weather information of the wind generator area and the repairing duration calculating step (S3) is a step of calculating the repairing duration based on a previously input database if the repairing type, the repairing personnel, and the weather information analyzed by the weather information analyzing step (S5) is input.

Further, the repairing time determining steps (S8 and S9) are a step of comparing and determining the weather condition holding days depending on the weather information analyzed by the weather information analyzing step (S5) with the calculated repairing duration to derive the repairing time.

This will be described in detail below.

First, the part state diagnosing step (S1) may be a step of receiving the preset threshold performance numerical values or the operating signals for parts of the wind generator to diagnose the state of the parts in real time.

In part state diagnosing step (S1), the current performance numerical value of the specific part is diagnosed and when the performance numerical value is diagnosed to be less than the threshold performance numerical value preset by a user, the information is transmitted to the user. Of course, even when parts are not operated, the part state diagnosis module 20 receives signals from operating sensors mounted in the parts and transmits the information to the user. This is performed by the part state diagnosis module 20.

The part performance diagnosis module diagnoses the change in the threshold performance numerical value at a predetermined period. Of course, the part performance diagnosis module may also continuously diagnose the change in the threshold performance numerical value in real time in response to the operating environment. Further, the part state diagnosis module 20 may simultaneously diagnose the state of the parts.

The part state diagnosing step (S1) may be omitted according to the embodiment.

Next, the repairing type determining step (S2) may be a step of determining the required repairing type or priority by comparing at least any one of the state of each part diagnosed in the part state diagnosing step (S1), the warehousing and stock condition of each part previously input, and the business trip and the vacation state of the user. This may be performed by the repairing type determination module 31.

If the information on whether each part reaches the threshold performance numerical value is received after the part state diagnosing step (S1), the required repairing type is first selected and the determination elements such as the warehousing and the stock condition of the respective parts previously input by the user and the business trip and the vacation state of the user are compared and determined, and as a result the priority for the parts to be repaired is defined.

The part type determining step (S2) may be omitted according to the embodiment.

Next, the repairing duration calculating step (S3) may be a step of calculating a repairing duration A based on the previously input database if the repairing type, the repairing personnel, and the weather information are input. This is performed by the repairing duration calculation module 33.

That is, if the repairing type is determined after the repairing type determining step (S2), the repairing type is input and the required repairing personnel is input, and if the specific weather information value corresponding to at least any one of the specific wind velocity, the precipitation, the wave height, and the temperature is input, the time when the user is required to perform the replacement work of the specific part is calculated in response to the weather condition.

That is, as shown in the above Table 2, if the user inputs a wind velocity of 5 m/s, a total of repairing duration is calculated like 21 H. Here, the weather information such as the wind velocity, the precipitation, the wave height, and the temperature may be compositely input, such that the previously established database may also be input with the repairing duration against various weather conditions.

The database may be one that may be input and stored in a database form by the user by averaging and error-correcting the repairing durations based on the work conditions previously performed in the wind generator area.

Meanwhile, if the repairing type is determined, the repairable weather information determining step (S4) may be performed. In the case of the repairing of the offshore wind generator, the repairable weather information is affected by the wind velocity, the wave height, or the like as shown in the above Table 3, and therefore the threshold wind velocity, the threshold wave height, or the like for each part are determined. For example, as shown in the above Table 3, in the case of the repairing of the yaw brake part, the threshold wind velocity represents 14 m/s and the threshold wave height represent 3 m/s.

Next, the weather information analyzing step (S5) may be a step of receiving the weather information of the wind generator area to analyze the weather information corresponding to at least any one of the wind velocity, the precipitation, the wave height, and the temperature. This extracts the weather information associated with the repairing of the wind generator among a variety of weather information transmitted from a meteorological office. This is performed by the weather information analysis module 41.

Meanwhile, the weather information variable correcting step (S6) may be a step of averaging the average weather condition for each season and each time or the weather information received at the plurality of observation posts to correct the received variables of the weather information. This predicts the weather condition this year by averaging the weather condition for a predetermined time and compares and determines the predicted weather condition with the received weather information, thereby correcting the error.

Further, the error from the weather information received from each observation post may be corrected by averaging the weather information received from the observation posts in several areas measuring the wind generator area.

The variable correction may be performed stepwise. First, the variable correction may be performed in such a manner that the weather information of the wind generator area is primarily corrected by averaging the weather conditions of this specific time measured at the observation posts of several areas, and then the error is secondarily corrected by comparing and analyzing the weather information of the wind generator area with the weather information for each season and each time in the last few years corresponding to the specific time. In this case, a weather information variable correction value D may be more accurately performed.

The weather information variable correction module 43 may be omitted according to the embodiment.

Next, the step (S7) of determining whether the repairing is required or not may be a step of comparing and determining the weather condition depending on the analyzed weather information with the pre-established workable weather condition to determine whether the wind generator may be repaired or not. This is performed by the module 35 determining whether the repairing is required or not.

Referring to FIG. 2, if a repairable weather information determination value C is larger than a weather information variable correction value D, YES is selected and the process proceeds to the repairing time determining steps (S8 and S9). For example, if the threshold wind velocity of the repairing of the yaw brake part is determined to be 4 m/s, it is determined that the repairing may be performed when the weather information variable correction value is 7 m/s.

On the contrary, if the repairable weather information determination value C is smaller than the weather information variable correction value D, NO is selected. In this case, the repairing time determination is temporarily delayed and the weather information is continuously analyzed and the variables are corrected. The process may be continued until the repairable weather condition is reached. For example, if the threshold wind velocity of the repairing of the yaw brake part is determined to be 4 m/s, it is determined that the repairing may not be performed when the weather information variable correction value is 16 m/s.

Here, the step (S7) of determining whether the repairing is required or not may immediately receive the weather information from the weather information analyzing step (S5) and when weather information variable correction module 43 is provided, may also receive the weather information of which the variables are corrected from the weather information variable correcting step (S6).

Further, the step (S7) of determining whether the repairing is required or not may be omitted according to the embodiment.

Next, the repairing time determining steps (S8 and S9) may be a step of comparing and determining a weather condition holding days B of the specific time depending on the weather information analyzed in the weather information analyzing step (S5) or the weather information of which the variables are corrected in the weather information variable correcting step (S6) with the repairing duration A calculated in the repairing duration calculating step (S3), thereby deriving the repairing time of the wind generator. This is performed by the repairing time determination module 37.

Referring back to FIG. 2, for example, as shown in FIG. 4, the weather information at the specific time of July in the summer is acquired and then the weather information on the wind velocity and the wave height of each date associated with the offshore wind generator work is extracted.

Consequently, as described above, depending on the weather information between July 3~4, in the repairing time determining steps (S8 and S9), it is determined that the weather condition between July 3~4 is good and it is acquired that the weather condition holding days is about 2 days.

Further, it is determined whether each repairing work may be performed based on the information received from the repairing duration calculating step (S3). In the case of the repairing of the yaw brake based on the above Table 3, the repairing duration is 20 H, and therefore the repairing may be performed. Therefore, the repairing time determination module 37 determines that the repairing possible time is July 3~4.

In this case, YES is selected. Thereafter, the user determines date determined in the repairing time determining steps (S8 and S9) and the work procedure is performed (S10). On the contrary, when date having the repairable weather condition is not present in July, NO is selected and the weather information is continuously analyzed or the variables are corrected, such that the repairing time is continuously determined.

Meanwhile, the method for repairing a wind generator according to the exemplary embodiment of the present disclosure may be configured to further include an emergency situation notifying steps (S12 and S13), a shelter area notifying step (S14), and extra work time determining steps (S16, S17, and S18). The emergency situation notifying steps (S12 and S13), the shelter area notifying step (S14), and the extra work time determining steps (S16, S17, and S18) may be a step that is executed while the user perform work in the wind generator area.

First, the emergency situation notifying steps (S12 and S13) may receive the real-time weather information during the repairing work in the wind generator area (S11) and compare the received weather information with the pre-established workable weather condition to transmit the shelter signal to the user. This may be performed by the emergency situation notification module 51.

If an analyzed weather information value E is larger than the weather information determination value C, YES is selected. In this case, a worker is notified that the weather information reaches the threshold wind velocity, the wave height, or the like. Of course, if the analyzed weather information value E is smaller than the weather information determination value C, NO is selected. In this case, only the real-time weather information is continuously received and analyzed.

The emergency situation notifying steps (S12 and S13) may be omitted according to the embodiment.

Next, the shelter area notifying step (S14) may serve to detect the real-time position of the user and notify the user of at least any one of the direction and the distance to the safety area, when the shelter signal is transmitted in the emergency situation notifying steps (S12 and S13). This may be performed by the shelter area notification module 53.

The real-time position of the user may be detected using a GPS apparatus. In the case of repairing, for example, the offshore wind generator, the shelter direction and distance about a shelter area that is an area where a wind velocity and a wave height are stabilized are notified to the user. The user may rapidly move to the most safety area based on the information received from the shelter area notification module 53, in the state which the weather condition is suddenly changed.

The shelter area notifying step (S14) may be omitted according to the embodiment.

Next, the extra work time determining steps (S16, S17, and S18) may receive the shelter signal from the emergency situation notifying steps (S12 and S13) or receives the shelter area from the shelter area notifying step (S14), and then if the user inputs a work progress interrupted due to the change in the weather condition, the extra work time determination module 60 may compare the repairing duration depending on the remaining work load with the weather condition holding time depending the real-time weather information to determine the remaining work execution time. This may be performed by the extra work determination module 60.

That is, by receiving the weather information, the current weather condition corresponds to the threshold wind velocity, the threshold wave height, or the like but the time when the weather condition in which the repairing work may be performed at a specific time is maintained is detected.

In detail, referring back to FIG. 2, a real-time weather information value F is analyzed (S15) and the analyzed real-time weather information value F is compared with the repairable weather information determination value C. If the repairable weather information determination value C is larger than the weather information value F, this means that the weather information does not reach the threshold wind velocity, the threshold wave height, or the like, and therefore YES is selected and the extra work duration is calculated (S16).

If the weather condition is continuously bad, and thus if the repairable weather information determination value C is larger than the real-time weather information valued F, NO is selected. In this case, the repairing work is interrupted and the withdrawal of the repairing work is determined (S16).

Here, when YES is selected, if the user inputs an extra work predicted duration G depending on the remaining work load due to the interruption of the repairing work (S17), in the extra work time determination module (60), the weather condition holding time H (S19) when the repairing work may be performed is compared with the extra work predicted time (S18). If the weather condition holding time H when the repairing work may be performed is shorter, the repairing time determination module 60 provides the information to the user and the user determines the final work interruption and the withdrawal (S20). On the contrary, when the weather condition holding time H when the repairing work may be performed is sufficient, the extra work time determination module 60 provides the information to the user and the user waits a specific time and then again returns to the wind generator area if the weather condition of the wind velocity, the wave height, or the like at the specific time is good to thereby finish the extra work (S21).

The extra work time determining steps (S16, S17, and S18) may be omitted according to the embodiment.

The exemplary embodiment of the present disclosure may efficiently calculate the repairing time of the wind generator based on the weather information by the foregoing configuration and control method. The foregoing contents describe the specific embodiment of the method and system for repairing a wind generator based on weather information.

Therefore, a person having an ordinary skill in the art to which the present pertains may easily understand that the present disclosure may be substituted and changed to various forms without departing from the scope of the present invention described in the following claims.

What is claimed is:

1. A method for repairing a wind generator based on weather information, the method using a computer processor for executing operations performed by a plurality of modules, the method comprising:

receiving operation signals and threshold performance numerical values from the wind generator by a part state diagnosis module, the operation signals representing measured performance numerical values obtained from sensors respectively mounted to each part of the wind generator and the threshold performance numerical values representing a part performance threshold for each part of the wind generator as preset by a user based on an acceptable loss of power generation;

diagnosing a part state of each part of the wind generator in real-time by determining in the part state diagnosis module whether a currently measured performance numerical value of a specific part of the wind generator exceeds a preset part performance threshold for the specific part of the wind generator, the diagnosing simultaneously including diagnosing a change in a threshold performance numerical value received over a predetermined period and continuously diagnosing the change in the threshold performance numerical value in real time in response to an operating environment of the wind generator;

transmitting the diagnosed state of each part from the part state diagnosis module to the user and to a repairing type determination module;

determining, in the repairing type determination module, a required repairing type and a priority of the required repairing type, the required repairing type determined according to the transmitted diagnosed state of each part, the priority of the required repairing type determined by comparing the diagnosed state of each part with a stock condition of a corresponding part and a work state of the user;

establishing a database by inputting to the database data indicative of each of a repairing type of an instance of repair work performed, a count of repairing personnel of the instance of repair work performed, and weather information incident to the instance of repair work performed, the repairing type categorized according to parts of the wind generator including the specific part of the wind generator;

analyzing weather information corresponding to the operating environment as determined by at least one weather condition of a wind velocity, a precipitation, a wave height, and temperature by receiving the weather information of an area of the wind generator in real time;

calculating a repairing duration based on the inputted data of the established database; and deriving a repairing time for the wind generator by determining a number of weather condition holding days based on the analyzed weather information and the calculated repairing duration, wherein the analyzing includes:
receiving real-time weather information during an instance of repair work being performed in the area of the wind generator;

extracting, from the received real-time weather information, weather information associated with the instance of repair work among the at least one weather condition, the extracted weather information corresponding to a time period including the repairing time and specifying the weather condition holding days of the time period in which the at least one weather condition has a value less than a weather condition threshold; and comparing the real-time weather information including an analyzed weather information value (E) with a pre-established workable weather condition including a reparable weather information determination value (C) to transmit a shelter signal to a user based on the comparison, and wherein the analyzing further includes:
interrupting work progress of the instance of repair work being performed in the area of the wind generator, the work progress interrupted in response to the shelter signal;

calculating a remaining work execution time after the work progress is interrupted;

comparing a repairing duration of a remaining work load expressed as an remaining work predicted duration (G) with a weather state holding time (H) calculated based on the real-time weather information received after the interrupting; and completing the remaining work load by restarting the repair work of the instance of repair work, when the remaining work predicted duration is less than the weather state holding time, wherein the user returns to the area of the wind generator after waiting a specific time until the extracted weather information indicates the at least one weather condition having the value less than the weather condition threshold.

2. The method of claim 1, further comprising:
determining whether repairing the wind generator is required by comparing the analyzed weather information with the pre-established workable weather condition.

3. The method of claim 1, further comprising:
detecting a real-time position of the user and notifying the user of at least one of a direction and a distance to a safety area, when the shelter signal is transmitted.

4. The method of claim 1, further comprising at least one of:
  correcting received variables of the weather information by averaging weather conditions for each season and each time, and
  correcting received variables of the weather information by averaging weather information received by a plurality of observation posts.

5. The method of claim 1, further comprising:
  primarily correcting the weather information of the wind generator area by averaging weather conditions of a specific time of a current year measured at observation posts of several areas and
  secondarily correcting an error by analyzing the weather information of the wind generator area with the weather information for each season and each time in previous years corresponding to the specific time.

6. The method of claim 2, wherein the determining whether the repairing is required includes at least one of
  correcting received variables of the weather information by averaging weather conditions for each season and each time, and
  correcting received variables of the weather information by averaging weather information received by a plurality of observation posts.

* * * * *